United States Patent

[15] 3,676,692

Nishikawa et al.

[45] July 11, 1972

[54] POSITIONING APPARATUS FOR ARTICLE WITH PORTION DETERMINING PORTION OF PREDETERMINED CONFIGURATION

[72] Inventors: Yukiyasu Nishikawa, Saitama-ken; Tsuneo Hidaka, Tokyo, both of Japan

[73] Assignee: Asahi Kogaku Kogyo Kabushiki Kaisha, Tokyo-to, Japan

[22] Filed: June 26, 1970

[21] Appl. No.: 50,069

[52] U.S. Cl. .........................250/231 R, 250/220 R, 356/152
[51] Int. Cl. .........................................................G01d 5/34
[58] Field of Search...................250/219 R, 211 J, 227, 216, 250/203, 231, 209, 220 R; 356/141, 152, 138

[56] References Cited

UNITED STATES PATENTS

| | | | |
|---|---|---|---|
| 3,448,280 | 6/1969 | Blitchington, Jr. et al. | 250/219 R |
| 3,277,304 | 10/1966 | Vyce | 250/227 |
| 3,028,500 | 4/1962 | Wallmark | 250/211 J |
| 3,432,671 | 3/1969 | Edmonds | 250/216 X |

*Primary Examiner*—Walter Stolwein
*Attorney*—Steinberg & Blake

[57] ABSTRACT

An article-positioning apparatus for precisely determining the location of an article either with respect to another article or with respect to a given reference. The article has a position-determining portion of a predetermined configuration. A prism which has the shape of a truncated pyramid is provided with opposed end faces one of which is smaller than the other with both of these end faces having the predetermined configuration of the position-determining portion of the article. An optical projector projects onto the smaller end face of the prism an image of the position-determining portion of the article, and the deviation of this image from a position of precise alignment with the smaller end face of the prism is determined so that the article can be positioned at a location where the image of the position-determining portion thereof is indeed precisely aligned with the smaller end face of the pyramid, whereupon it is known that the article is then precisely situated at the desired location.

9 Claims, 16 Drawing Figures

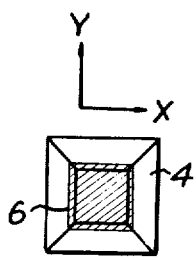
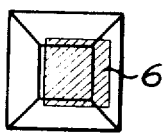
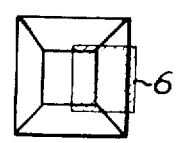
FIG. 3A     FIG. 3B     FIG. 3C
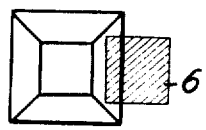
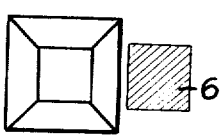
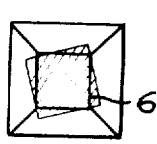
FIG. 3D     FIG. 3E     FIG. 3F
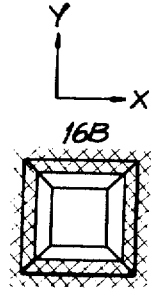
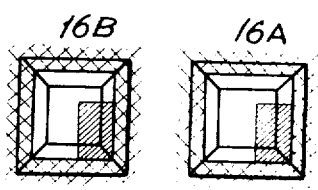
FIG. 6A          FIG. 6C
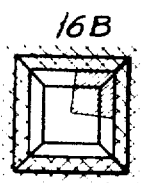
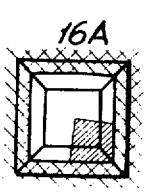
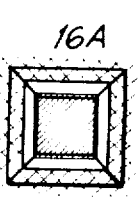
FIG. 6B          FIG. 6D INVENTORS
YUKIYASU NISHIKAWA
TSUNEO HIDAKA
BY
*Steinberg & Blake*
ATTORNEYS

POSITIONING APPARATUS FOR ARTICLE WITH PORTION DETERMINING PORTION OF PREDETERMINED CONFIGURATION

BACKGROUND OF THE INVENTION

The present invention relates to an apparatus for precisely situating an article at a desired location. For example, the apparatus may be used for automatically aligning two objects one with respect to the other.

The invention relates in particular to an apparatus which can detect the deviation of the article from the desired location in a highly precise manner so as to achieve a precise positioning of the article when no deviation from the desired position is detected.

Techniques for accurately aligning a pair of wafer-like objects in a predetermined relationship with respect to each other as well as techniques for aligning a single object with respect to a given reference, with these positions being determined with a high degree of accuracy, have been required as in the case where it is desired to achieve precise alignment between a mask and a wafer in the manufacture of integrating circuits or in the achievement of precise alignment for preventing color deviation during color printing.

Considering, for example, the technique used in the alignment of a mask during manufacture of integrating circuits, it is known to provide position-determining marks both for the mask and for the wafer. These components are then manually moved until the positioning marks coincide, and during these operations the deviation of the positioning marks from their precision of coincidence is checked through a microscope. These operations require an extremely high degree of skill on the part of the operator and in addition repetition of the operations for as much as six or seven times are required during the fabrication of an integration circuit, so that many skillful operators are required for these purposes, as is well-known. Attempts have indeed been made to automate these operations as well as others of the same type used in many different applications, but because of the difficulties encountered in detecting the deviation of the article from the desired position all of the proposed solutions to the problem have proved to be of no practical value.

SUMMARY OF THE INVENTION

It is accordingly a primary object of the invention to provide an apparatus which will avoid the above drawbacks.

In particular, it is an object of the present invention to provide for an apparatus used in the positioning of an article a structure which will reliably detect in a highly precise manner the deviation of the position of the article from the required location thereof, so that this deviation can be used to determine the proper position of the article.

In particular, it is an object of the present invention to provide an apparatus which uses optical and electrical means to determine the deviation of an article from its required location with a high degree of precision.

Furthermore, it is an object of the invention to provide a construction of this type which can function not only to determine the deviation in linear directions but also to determine angular deviation, so that an article can be positioned both linearly and angularly.

It is, in particular, an object of the invention to provide a construction which while simple and relatively inexpensive nevertheless operates in a highly reliable manner lending itself to incorporation into apparatus for automatically determining the precise positioning of an article either with respect to a given reference or with respect to another article.

According to the invention, the article whose position is to be determined has a position-determining portion of a given configuration. A prism of the configuration of a truncated pyramid is provided with the opposed end faces of the prism, one of which is smaller than the other, also having the configuration of the position-determining portion of the article. A projecting means projects onto the smaller end face of the prism an image of the position-determining portion of the article, and the of this image from a position of precise alignment with the smaller end face of the prism is detected by a deviation-determining means which co-acts with the prism. Through this latter means it becomes possible to detect the extent and direction of deviation of the image from the required position so that the article can have its location changed until it is situated precisely at a location where the image of the position-determining portion is in precise alignment with the smaller end face of the prism, thus achieving in a highly accurate manner the desired location of the article. The invention is illustrated by way of example in the accompanying drawings which form part of this application and in which:

FIG. 2 is normal to the Z axis;

Figure 4A:
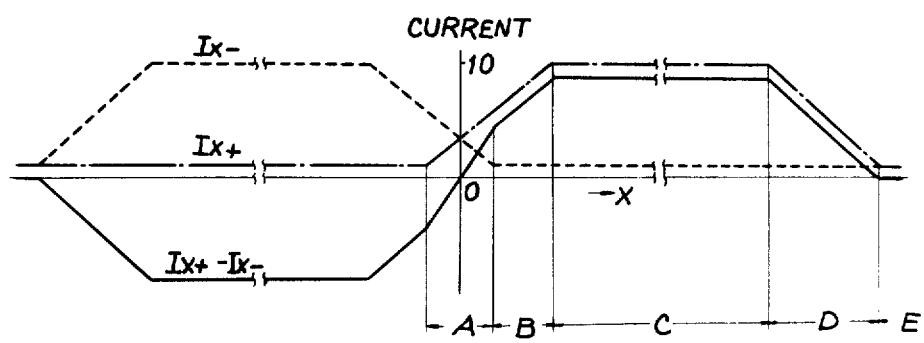
Figure 4B:
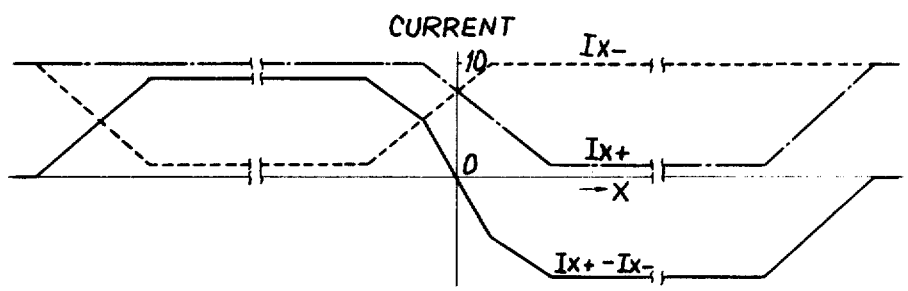
Figure 5A:
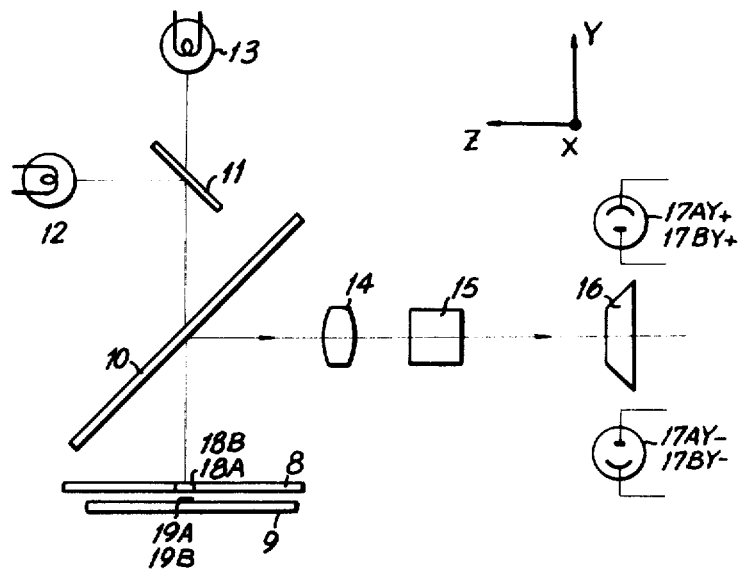
Figure 5B:
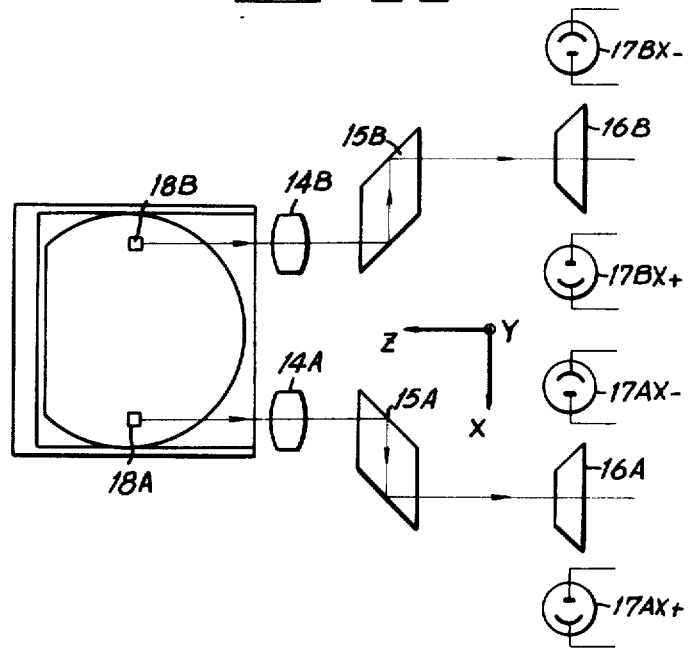

FIGS. 3A – 3F, respectively illustrate schematically various position of a positioning image with respect to a prism of the invention;

FIGS. 4A and 4B are respectively graphs showing the current output of the apparatus in connection with determination of deviation of an image from the required position;

FIG. 5A is a side elevation of another embodiment of the invention which is schematically illustrated in FIG. 5 which again shows the mutually perpendicular X, Y and Z axes, the plane of FIG. 5A being normal to the X axis;

FIG. 5B is a schematic plan view perpendicular to the Y axis of FIG. 5A and showing further details of the embodiment of FIG. 5A, FIG. 5B also illustrating the X and Z axes; and FIGS. 6A – 6D respectively illustrate various positions of images of position-determining portions with respect to the prisms of FIGS. 5A and 5B.

DESCRIPTION OF PREFERRED EMBODIMENTS

Figure 1:
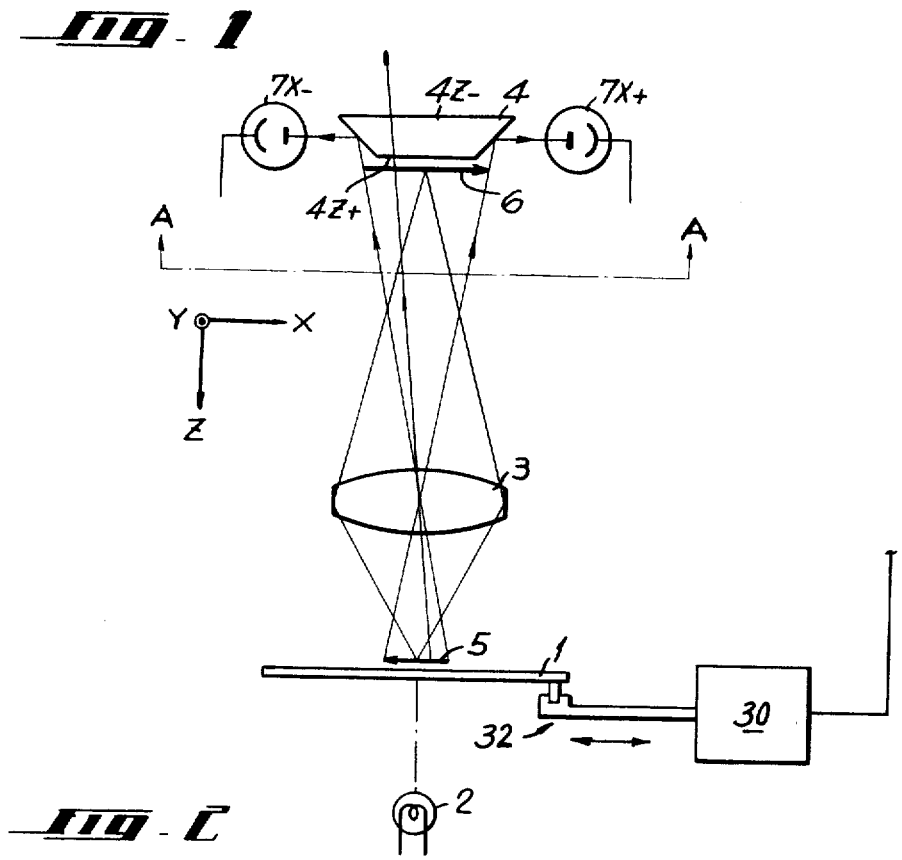
FIG. 1 is a schematic side elevation of an apparatus of the invention shown in a plane normal to the Y axis, with the X and Z axes being illustrated in FIG. 1.
Figure 2:
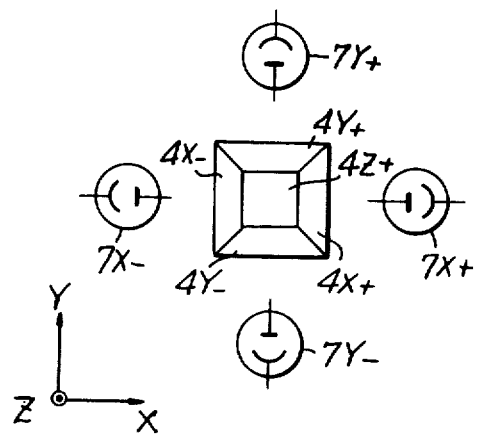
FIG. 2 is a plan view taken along line A—A of FIG. 1 in the direction of the arrows and schematically illustrating the prism and deviation-determining means of the invention, with FIG. 2 also show the X and Y axes, and in this case

The basic arrangement of the apparatus of the invention is illustrated in FIGS. 1 and 2. By way of example, there is illustrated in FIG. 1 an object 1 the position of which is to be accurately determined. For this purpose, the object 1 has a position-determining portion schematically represented in FIG. 1 as having the configuration of an arrow 5 having a head at its left end, as viewed in FIG. 1. The optical properties of the position-determining portion 5 are such that they will differ sharply from the parts of the object 1 surrounding the portion 5. For example, this portion 5 may be highly transparent while the portion of object 1 surrounding portion 5 may be opaque, or the portion 5 may be highly reflecting while the part of object 1 surrounding the portion 5 is substantially less reflecting. Assuming, for example, that the portion 5 is in the form of an opening in the object 1 of a given configuration, then light from a light source 2 will simply travel through this opening.

A projecting means is provided for projecting an image of the portion 5 which is uniformly illuminated by the light source 2. This projecting means takes the form of a projector lens system 3 schematically represented and providing a projected image 6 of the position-determining portion 5.

Referring now to FIG. 2 as well as FIG. 1, the apparatus of the invention further includes a prism 4 having the shape of a truncated pyramid. In the illustrated example, the prism 4 has opposed end faces 4Z+ and 4Z− with the end face 4Z+ being smaller than the end face 4Z−. These end faces are square and are angularly aligned as well as parallel to each other with these faces being normal to a common optical axis which passes perpendicularly and centrally through these end faces of the prism 4. The portion 5 in actual practice will have a configuration which is the same as that of the end faces of the prism so that the image 6 will have a configuration matching that of the end face 4Z+. Of course, the prism 4 has its location fixed by any suitable supporting structure so that the projected image 6 is precisely focused on the smaller end face 4Z+.

Although it is possible to use with the invention prisms of any desired configuration whose end faces match the configuration of the position-determining portion of the article or object 1, such as, for example, a prism of a truncated triangular configuration or a truncated pentagonal pyramid for effectively determining the extent of deviation of the image from the required position, the square configuration illustrated is preferred because it provides the simplest possible controls and interrelationship between the detecting system and the controls which determine the position of the object or article 1.

The illustrated truncated pyramid has, in addition to the flat, parallel end faces 4Z+ and 4Z−, four slanting side surfaces 4X+, 4X−, 4Y+, and 4Y−. The arrangement of these flat sloping side surfaces is clearly apparent from FIG. 2. Thus, light projected by the optical projector 3 toward the smaller end face 4Z+ will be reflected from the slanting side surfaces of the prism. Furthermore, while light will be reflected by the sloping side surfaces, the properties of the prism are such that the light will pass directly through the flat end faces 4Z+ and 4Z−.

The deviation-detecting means illustrated takes the form of four photoelectric elements 7X+, 7X−, 7Y+, and 7Y−, respectively situated in the path of light reflected from the sloping side surfaces of the prism, in the manner clearly apparent from FIGS. 1 and 2. Thus, the light which is focused at a location beyond the end face 4Z+ of the prism 4 will be reflected by the sloping side surfaces to be received by the photoelectric elements in alignment therewith. On the other hand, that light which is directly focused in the form of an image received by the smaller end face 4Z+ of the prism 4 is transmitted directly through the prism to exit at the larger end face 4Z− thereof. The configuration of the position-determining portion 5 of the object or article 1 is such that it corresponds precisely to the configuration of the end face 4Z+ of the prism, so that actually in the illustrated example the portion 5 shown schematically as an arrow in FIG. 1 has the configuration of a square and may be, for example, an opening of square configuration passing through the object or article 1 and uniformly illuminated from the light source 2. In actual practice it has been found best to provide by way of the position of the components with respect to each other and the properties of the projecting means 3 an image 6 the size of which is slightly larger than the size of the smaller end face 4Z+ of the prism 4.

The extent of deviation of the image 6 from a position of precise alignment with the end face 4Z+ is detected by the several photoelectric elements to be transmitted in the form of electrical signals to suitable controls 30, schematically represented in FIG. 1, so that these controls can act through a transmission 32, also schematically represented, for the purpose of shifting the object or article 1 automatically until the deviation of the image 6 from the desired location is detected by the photoelectric elements as being equal to zero.

The actual operations are illustrated in connection with FIGS. 3 and 4. Thus, assuming that the output currents of the photoelectric elements are respectively IX+, IX−, IY+ and IY− and that the variation of the photoelectric elements are corrected by a suitable method such as an applied voltage in the case of photoelectron multiplier tubes, then it is possible to achieve an automatic positioning of the object 1. In order to simplify the description it is assumed that the light-transmission factor within the area of the position-determining portion 5 through which light passes is 10 times the extent of light transmission beyond the outer periphery of the position-determining portion 5, which is to say, beyond the edge which defines the configuration of the opening 5. Also, for the sake of simplicity, it is assumed that the deviation direction is only along the X axis. Thus, in FIG. 3A the shaded square 6 represents the location of the image of the position-determining portion 5 when precise alignment with the smaller end face 4Z+ of the prism 4 is achieved. Thus, assuming that the light intensity of the light providing the image 6 is 10 times that of the area surrounding the position-determining portion 5, then a clear image 6 will be projected onto the prism in the manner shown schematically in FIGS. 3A - 3E. In the final precisely determined non-deviation position of the image shown in FIG. 3A, the intensities of the light received by the photoelectric elements 7X+ and 7X− are equal to each other while in the case of a deviation in the direction +X, the intensity of light received by the photoelectric element 7X+ is greater than that received by the opposite photoelectric element 7X−. Thus, as the image 6 is shown progressively deviating to a greater extent from the position of FIG. 3A in the several positions FIG. 3B - FIG. 3E, the greater light intensity of the image 6 will provide for the photoelectric element 7X+ at different electrical output than that for the photoelectric element 7X−. The output currents which can be achieved through such elements are illustrated in the graphs of FIGS. 4A and 4B. FIGS. 4A and 4B illustrate the output currents IX+ and IX− of the photoelectric elements 7X+ and 7X−, respectively, together with the output current differential (IX+ - IX−), based on the intensity of the light received by the photoelectric elements 7X+ and 7X− under the conditions respectively illustrated in FIGS. 3A - 3E. Thus, referring to FIG. 4A, the output currents corresponding to FIG. 3A are illustrated at the region A of the graph. It will be noted that when progressing to the right through the regions of the graph corresponding to FIGS. 3B and 3C, the output current of photoelectric element 7X− diminishes slightly and remains at a constant low value while the output current of photoelectric element 7X+ increases to reach a maximum at the area of the graph C corresponding to FIG. 3C. At this time, the most intensely illuminated image 6 extends completely across the sloping surface 4X+ which reflects light to the element 7X+. Then when the image shifts further through the position of FIG. 3D and into the position of FIG. 3E, the output currents change as illustrated at the right portion of FIG. 4A. In this way, detection of deviation can be very accurately determined.

FIG. 4B shows the reverse arrangement of FIG. 4A in that with FIG. 4B the position-determining portion 5, instead of providing a light intensity 10 times as great as that of the surrounding area of the object or article provides a light intensity which is one-tenth of the surrounding area of the object or article. In other words, it is only important that there be a sharp contrast in the light-transmitting or light-reflecting properties of the position-determining portion 5 and the surrounding area of the object. Thus, with FIG. 4B the output currents are those which will result when the position-determining portion 5 has a transmission factor which is one-tenth of the surrounding light-transmission factor.

As is apparent from FIGS. 4A and 4B, it is possible to detect deviation both with respect to extent and direction from the difference between the output currents of the opposed photoelectric elements within the range where the projected image of the position-determining portion at least partly overlaps the prism which has the truncated pyramid shape illustrated. In addition, a detection sensitivity $1/\Delta X \cdot \Delta(IX+ - IX-)$ relative to a slight amount of deviation $\Delta X$ is sharply greater at the region where the precise coincidence or desired location of the images and of the article is achieved. It is therefore clear that a higher degree of accuracy in the positioning of the object is achieved when using these detection operations for the automatic alignment apparatus 30 which is schematically represented in FIG. 1.

In the case of angular deviation, schematically represented in FIG. 3F, the sensitivity of the detection is somewhat reduced but nevertheless it is still possible with the above-described apparatus to detect a deviation from the required position so that accurate location of the image and the object can be achieved in this case also.

While the above description has dealt with deviation in the X direction, deviation in the Y direction is simultaneously detected based upon the output current differential (IY+ − IY−) with respect to the other pair of photoelectric elements 7Y+ and 7Y−, as was the case with deviation in the X direction. Also, it is possible to provide an optical system for achieving a reflected image when the position-determining portion 5 is designed as a reflecting surface having a reflecting factor substantially different from that of the surrounding area of the object. In this case also it is possible to detect the deviation in the same way as when the light is transmitted through a transparent portion.

A further embodiment of the invention is illustrated in FIGS. 5A and 5B, and this embodiment is particularly useful for achieving angular positioning of an article as well as longitudinal and transversal positioning thereof. FIGS. 5A and 5B are specifically directed to the apparatus as embodied in mask alignment during fabrication of integration circuits. Referring to FIGS. 5A and 5B, the mask 8 is to be used for subsequent exposure. A semi-transparent mirror 10 transmits illuminating light and at the same time partially reflects light reflected by a wafer 9 to the deviation-detecting system. An illumination source 12 is provided for a source of light used for positioning purposes while a second source of light 13 is used for exposure purposes. The mirror 11 is rotatable between the position illustrated in FIG. 5A where it interrupts light from the exposure lamp 13 and reflects light from the lamp 12 to a position where it permits light from the lamp 13 to pass so as to be used for exposure purposes. In this way, a changeover between the light sources 12 and 13 is achieved.

The mask 8 is formed with a pair of position-determining portions 18A and 18B in the form of square openings passing through the mask 8 and located thereon as illustrated in FIG. 5B. A pair of detecting systems are provided for respectively coacting with the pair of position-determining means 18A and 18B. These detecting systems include the pair of optical projecting means having the enlarging projecting lens systems 14A and 14B. In addition, the optical systems include the pair of prisms 16A and 16B each of which is of the truncated configuration described above in connection with the prism 4 so that these prisms 16A and 16B have smaller square end faces toward which images of position-determining portions 18A and 18B are projected by the pair of optical projecting means 14A and 14B. Four photoelectric elements 17AX+, 17AX−, 17Ay+ and 17AY− are respectively positioned opposite and in alignment with the slanting side surfaces of the prism 16A to receive light reflected by the latter surfaces, and four photoelectric elements 17BX+, 17BX−, 17BY+ and 17BY− are respectively positioned opposite the sloping side surfaces of the prism 16B to receive light reflected from the latter surfaces. The prisms 15A and 15B are provided simply to spread the optical axes apart from each other so that the paths of light travel from the pair of position-determining means 18A and 18B will be located at a greater distance from each other. In this way it becomes possible to arrange in a very convenient manner the pair of prisms 16A and 16B and the several photoelectric elements coacting therewith. It will be noted that with this arrangement, the distance between the prisms 16A and 16B can be considerably greater than that between the position-determining portions 18A and 18B.

The mask 8 is positioned after adjustment in such a way that enlarged images of the portions 18A and 18B respectively coincide with the smaller end faces of the prisms 16A and 16B. It is assumed that the areas within the portions 18A and 18B are transparent in that these portions are in the form of simple openings of square configuration passing through the mask while the parts of the latter surrounding the openings 18A and 18B are black and opaque. FIG. 6A shows the pair of prisms 16A and 16B with the shaded areas surrounding the bright images which are directed onto the prisms. Thus, the shaded areas of prisms 16A and 16B represent the opaque or black portions surrounding the portions 18A and 18B through which light travels to achieve the square images which are in precise alignment with the prisms when the desired position of the mask is achieved, as indicated by the positions of the images with respect to the prisms in FIG. 6A. Under the conditions where the precise positioning has been achieved, the output currents of the eight photoelectric elements will have the relationships:

$$IAX+ - IAX- = 0 \qquad IAY+ - IAY- = 0$$
$$IBX+ - IBX- = 0 \qquad IBY+ - IBY- = 0$$
$$IAX+ - IBX+ = 0$$

In the above listing, the several output currents are those of the eight photoelectric elements respectively situated opposite the sloping surfaces of the prisms.

It is possible with this arrangement to achieve a higher accuracy by providing on the wafer 9 additional position-determining portions 19A and 19B in the form of light-reflecting marks which are of a square configuration matching the configurations of the position-determining portions 18A and 18B but which will provide smaller images which can be precisely aligned centrally within the images of the portions 18A and 18B. The distance between the portions 19A and 19B is of course equal to that between the portions 18A and 18B on the mask. However, these portions 19A and 19B are smaller than the portions 18A and 18B while having a matching configuration. Therefore, all of these portions are of a square configuration in the illustrated example. The arrangement is such that the reflected images of the portions 19A and 19B will be just slightly larger than the areas of the smaller end faces of the prisms. It is assumed that for the convenience of explanation the reflection factors of the portions 19A and 19B are smaller than those at the outer peripheries or beyond the outer peripheries thereof, respectively.

Thus, the wafer 9 is positioned beneath the mask 8 in such a manner that the portions 19A and 19B are at least partially visible through the portions 18A and 18B on the mask 8. This may be achieved, for example, by placing a linear edge of the wafer (i.e., orientation flat) against a suitable reference surface. FIG. 6B illustrates by way of example the images projected with the components in this position. In FIG. 6B the inner shaded areas within the images of the openings 18A and 18B represent at least parts of the reflected images of the portions 19A and 19B. The output currents of the several photoelectric elements are compared with each other and the structure operates automatically to provide for the wafer 9 a rotary position which is controlled in such a way as to establish:

$$IAY+ - IBY+ = 0 \qquad IAY- - IBY- = 0$$
$$IAX+ - IBX+ = 0$$

With this latter set of relationships, the position shown in FIG. 6C is achieved. At this time, there is equality in the illumination at the prism by the images projected thereon, but the inner images formed by portions 19A and 19B are still not precisely positioned. To achieve this latter precise positioning the controls continue to operate in the directions X and Y to bring about the perfected alignment between the portions 18A and 18B on mask 8 and portions 19A and 19B on wafer 9, as illustrated with the image positions in FIG. 6D. This procedure for mask alignment is applicable not only with respect to mask alignment in contact exposure techniques as referred to above, but also in the enlarged projection exposure technique.

It is apparent from the above description that the invention may be used for detection of deviation in automatic alignment apparatus with the following advantages:

1. The use of the prism of truncated square pyramidal configuration facilities detection of deviation in two dimensions, or in other words, along a pair of mutually perpendicular axes. The signals which are obtained are easily coupled with the control system due to the distinct direction of the deviation. Higher accuracy of alignment can be attained where the photoelectric element and the amplifier both have a relatively narrow range of operation inasmuch as a detection sensitivity is sharply higher adjacent the point when precise alignment is achieved while it is substantially lower within an area of a substantial deviation from the required position.

2. An arrangement where the image focused at the smaller end face of the truncated prism may be observed when viewing the latter through the larger face thereof provides the possibility of various additional functions referred to below without any interception of the light path in the optical system for detecting the deviation. It is possible, for example, to detect the state of the alignment with the naked eye by observing the projected image if cross hairs are provided not only intersecting at the center of the larger end face of the truncated pyramid which forms the prism but also at the center of the position-determining portion. The possibility of this latter operation is of great advantage for balancing the adjustment of each photoelectric element. Furthermore, deviation along three mutually perpendicular axes is also possible by detecting the manner in which the image is focused at the smaller end face of the prism. Thus, it can be detected whether the image is focused precisely at the smaller end face of the prism or at a location relatively near to or relatively far from the smaller end face of the prism, so that in this way deviations not only along the X and Y axes but along the Z axis can be detected.

What is claimed is:

1. In an apparatus for positioning an article which has at least one position-determining portion of a predetermined polygonal configuration, at least one prism having the shape of a truncated pyramid and including a pair of opposed end faces one of which is smaller than the other and both of which have said predetermined configuration, said end faces of said truncated pyramid being angularly aligned, and said truncated prism having slanting side surfaces extending between said end faces from the edge of the smaller to the edge of the larger of said end faces, said end faces being parallel and perpendicular to a common optical axis passing centrally through said end faces, projecting means coacting with said prism for projecting onto said smaller end face an image of said position-determining portion of the article, the latter article being precisely situated in a desired location when the image of said position-determining portion is precisely aligned axially and angularly with respect to the axis of the prim and with said smaller of the end faces of said prism, and deviation-determining means for determining the extent to which the location of said image deviates from a position of precise alignment with said smaller end face of said prism.

2. The combination of claim 1 and wherein said polygonal configuration is a regular polygon.

3. The combination of claim 2 and wherein said projecting means provides for said position-determining portion of the article an image whose magnitude is at least as great as that of said smaller end face of said prism.

4. The combination of claim 3 and wherein said projecting means provides for said image a magnitude which is slightly greater than that of said smaller end face of said prism, so that when said image is precisely positioned with respect to said smaller end face, the peripheral regions of said image extend onto the regions of said slanting prism surfaces which adjoin said smaller end face.

5. The combination of claim 3 and wherein said deviation-determining means includes a plurality of photoelectric elements positioned in the path of light reflected from said slanting side surfaces of said prism, respectively, for providing signals which can be compared in accordance with the differences in light received by said photoelectric elements for determining the extent and direction of deviation of said image from the position of precise alignment with said smaller end face of said prism, so that the article can have its position changed until all of the photoelectric elements receive uniform amounts of light indicating precise alignment of said image with said smaller end face of said prism.

6. The combination of claim 1 and wherein the article has a pair of spaced position-determining portions of said configuration, there being a pair of said prisms and a pair of said projecting means respectively projecting images of said position-determining portions onto the smaller end faces of said prisms, whereby precise alignment of said images with said smaller end faces of said prisms will angularly orient the article.

7. The combination of claim 1 and wherein the position-determining portion of the article is in the form of an opening of said predetermined configuration, so that light passing through said opening is projected by said projecting means onto said smaller end face of said prism to provide said image the configuration of which corresponds to that of said opening, and an additional position-determining element situated in alignment with said opening for reflecting light therethrough and having a configuration which will provide a reflected image of said additional position-determining element smaller than that of said opening so that when the reflected image is aligned within the larger image of said opening, a precise determination of the location of the article is achieved.

8. The combination of claim 1 and wherein said configuration is that of a square, said prism having square end faces and four slanting flat sides extending therebetween, and said deviation-determining means determining the deviation of said image with respect to at least a pair of mutually perpendicular axes.

9. The combination of claim 8 and wherein said deviation-determining means includes photoelectric elements respectively situated opposite said four slanting sides for receiving light reflected therefrom to determine the deviation of the image along said pair of mutually perpendicular axes.

* * * * *